US012614997B2

(12) United States Patent　(10) Patent No.: US 12,614,997 B2
Minami　(45) Date of Patent: Apr. 28, 2026

(54) IMAGE READING DEVICE AND CONTROL METHOD FOR IMAGE READING DEVICE

(71) Applicant: SEIKO EPSON CORPORATION, Tokyo (JP)

(72) Inventor: Yuki Minami, Osaka (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 18/474,342

(22) Filed: Sep. 26, 2023

(65) Prior Publication Data

US 2024/0113641 A1　Apr. 4, 2024

(30) Foreign Application Priority Data

Sep. 29, 2022　(JP) ................................. 2022-155980

(51) Int. Cl.
H02P 7/285 (2016.01)
H04N 1/00 (2006.01)
H04N 1/10 (2006.01)

(52) U.S. Cl.
CPC ......... H02P 7/285 (2013.01); H04N 1/00602 (2013.01); H04N 1/1035 (2013.01); H04N 2201/04755 (2013.01)

(58) Field of Classification Search
CPC .......... H04N 1/00588; H04N 1/00602; H04N 1/1035; H04N 1/00652; H04N 2201/04755; H02P 7/285
USPC ........................................................ 388/815
See application file for complete search history.

(56) References Cited

U.S. PATENT DOCUMENTS

| | | | | |
|---|---|---|---|---|
| 9,952,545 | B2* | 4/2018 | Nito .................... | G03G 15/6529 |
| 2008/0117481 | A1* | 5/2008 | Akiyama ................. | H04N 1/12 |
| | | | | 358/488 |
| 2009/0039594 | A1* | 2/2009 | Sato ......................... | H04N 1/17 |
| | | | | 271/258.01 |
| 2018/0358913 | A1* | 12/2018 | Ogihara .................. | H02P 21/22 |
| 2020/0073281 | A1* | 3/2020 | Kagawa ............. | G03G 15/5037 |
| 2021/0408949 | A1* | 12/2021 | Miyashita ............... | H02P 6/186 |
| 2022/0017318 | A1* | 1/2022 | Arai ....................... | B65H 5/062 |
| 2022/0029562 | A1* | 1/2022 | Ohashi .................... | H02P 6/185 |

FOREIGN PATENT DOCUMENTS

JP　2003-015483 A　1/2003

* cited by examiner

*Primary Examiner* — Gabriel Agared
(74) *Attorney, Agent, or Firm* — WORKMAN NYDEGGER

(57) ABSTRACT

An image reading device includes a DC motor, a roller driven by the DC motor, a reading unit configured to read an image from a document conveyed by the roller, and a control unit configured to control driving of the DC motor. The control unit is configured to detect a power load value of the DC motor. The control unit is configured to determine that the power load value of the DC motor exceeds a first threshold value in a state in which the control unit controls the DC motor to convey the document at a first conveyance velocity, and then, control the DC motor to convey the document at a second conveyance velocity lower than the first conveyance velocity.

12 Claims, 7 Drawing Sheets

IMAGE READING DEVICE AND CONTROL METHOD FOR IMAGE READING DEVICE

The present application is based on, and claims priority from JP Application Serial Number 2022-155980, filed Sep. 29, 2022, the disclosure of which is hereby incorporated by reference herein in its entirety.

BACKGROUND

1. Technical Field

The present disclosure relates to an image reading device for reading an image from a document and a control method for the image reading device.

2. Related Art

For example, JP-A-2003-15483 discloses an image reading device that conveys a document through driving of a DC motor and reads an image from the document that is being conveyed. In such an image reading device, a timing at which the image reading device becomes nonavailable is determined based on a rotation velocity of a DC motor. In particular, when the timing at which the image reading device becomes nonavailable suddenly arrives and a period in which the image reading device is not available becomes longer, the convenience for a user is impaired. Therefore, a margin is set at the timing at which the image reading device becomes nonavailable in order to shorten the period in which the image reading device is not available as much as possible.

However, in the image reading device described in JP-A-2003-15483, although the timing at which the image reading device becomes nonavailable can be identified early, the timing itself at which the image reading device becomes nonavailable is not made later, and it is desired to improve the convenience of the user.

SUMMARY

An image reading device that solves the above problems includes a DC motor; a roller driven by the DC motor; a reading unit configured to read an image from a document conveyed by the roller; and a control unit configured to control driving of the DC motor, wherein the control unit is configured to detect a power load value of the DC motor, and the control unit is configured to determine that the power load value of the DC motor exceeds a first threshold value in a state in which the control unit controls the DC motor to convey the document at a first conveyance velocity, and then, control the DC motor to convey the document at a second conveyance velocity lower than the first conveyance velocity.

A control method for an image reading device including a DC motor, a roller driven by the DC motor, a reading unit configured to read an image from a document conveyed by the roller, and a control unit configured to control driving of the DC motor, wherein the control unit is configured to determine that a power load value of the DC motor exceeds a first threshold value when the control unit controls the DC motor to convey the document at a first conveyance velocity, and then, control the DC motor to convey the document at a second conveyance velocity lower than the first conveyance velocity.

DESCRIPTION OF EMBODIMENTS

First Embodiment

An embodiment of an image reading device and a control method for the image reading device will be described below with reference to the drawings. In the following description, a direction in which a document is conveyed is defined as a conveyance direction Y, and a direction crossing the conveyance direction Y is defined as a width direction X.
Configuration of Image Reading Device 10

Figure 1:
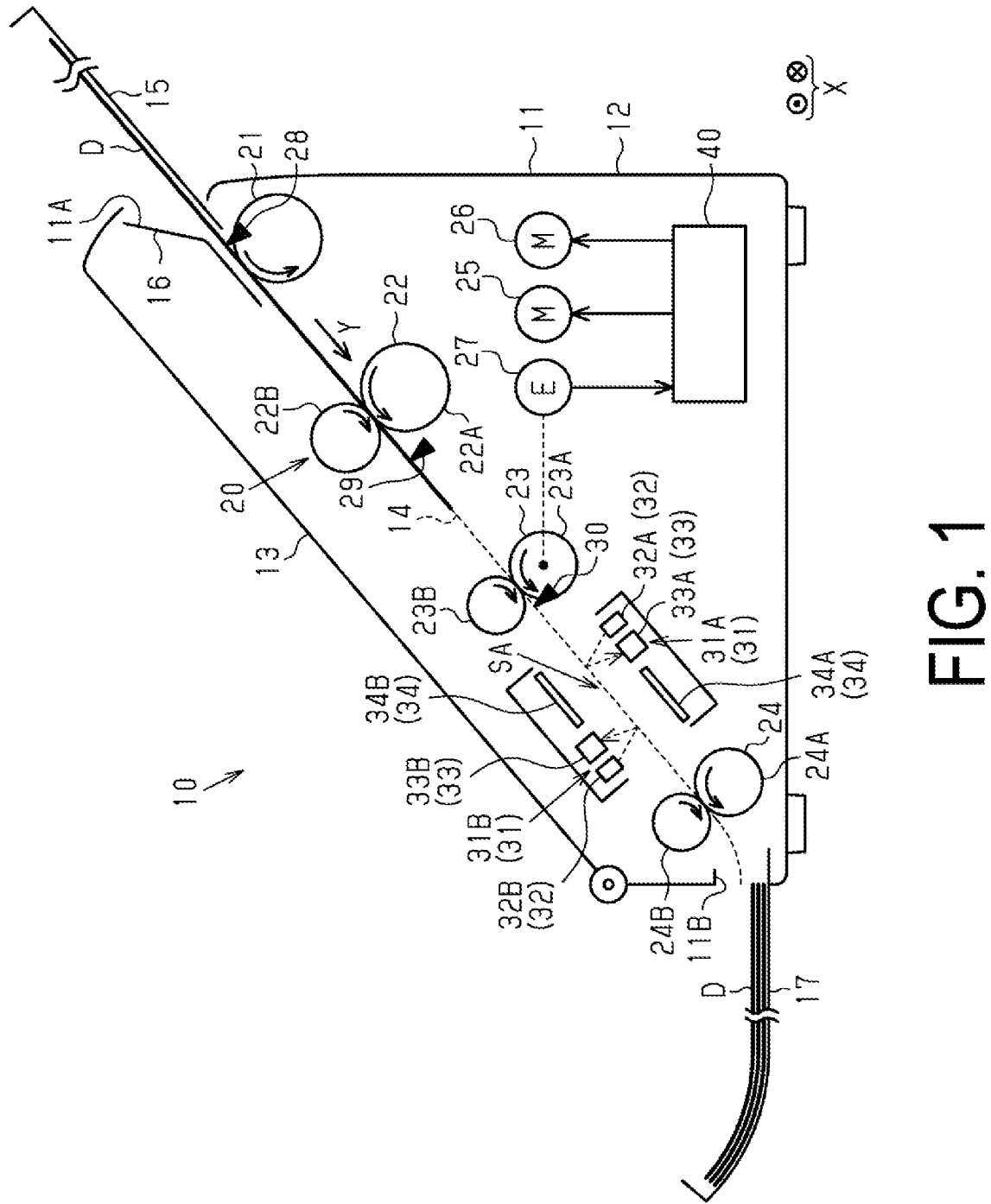
FIG. 1 is a schematic lateral cross-sectional view illustrating an image reading device.

As illustrated in FIG. 1, the image reading device 10 is configured to read an image from a document D. In particular, the image reading device 10 is configured to convey the document D and read an image from the document D being conveyed.

The image reading device 10 includes a housing 11. The housing 11 is configured to accommodate various members. The housing 11 includes a body portion 12 and a cover portion 13. The cover portion 13 is connected to the body portion 12 so that the cover portion 13 can be opened and closed.

The housing 11 includes a feeding port 11A. The feeding port 11A is provided between the main body portion 12 and the cover portion 13. The feeding port 11A is an opening for feeding the document D before being read into the housing 11.

The housing 11 includes an ejection port 11B. The ejection port 11B is provided between the main body portion 12 and the cover portion 13. The ejection port 11B is an opening for ejecting the read document D from the housing 11 to the outside.

The housing 11 includes a conveyance path 14. The conveyance path 14 is provided between the main body portion 12 and the cover portion 13. The conveyance path 14 is provided between the feeding port 11A and the ejection port 11B. The conveyance path 14 is a path for conveying the document D from the feeding port 11A to the ejection port 11B.

The image reading device 10 may include a document support 15. The document support 15 is provided above the feeding port 11A. The document support 15 is configured to extend from the housing 11. One or a plurality of documents D before reading can be placed on the document support 15.

The image reading device 10 includes a feeding guide 16. The feeding guide 16 is housed in the housing 11. The feeding guide 16 is provided below the feeding port 11A. The feeding guide 16 guides the document D fed into the housing 11 from the feeding port 11A, along the conveyance path 14.

The image reading device 10 may include a stacker 17. The stacker 17 is provided below the ejection port 11B. The stacker 17 may be accommodated in the housing 11 to be slidable in a front-rear direction that intersects the width direction X.

Conveyance Unit 20

The image reading device 10 includes a conveyance unit 20. The conveyance unit 20 is housed in the housing 11. The conveyance unit 20 is configured to convey the document D along the conveyance path 14. The conveyance unit 20 is configured to convey the document D to the reading area SA and eject the document D from the ejection port 11B.

The conveyance unit 20 includes a paper feed roller 21. The paper feed roller 21 is provided at an upstream end of the conveyance path 14. The paper feed roller 21 is provided at a position facing the feeding guide 16. The paper feed roller 21 is rotated by a driving force transmitted from a first driving unit 25, which will be described below. In other words, the paper feed roller 21 is configured to be driven by the first driving unit 25, which will be described below. The paper feed roller 21 is configured to feed the documents D placed on the document support 15 into the housing 11 one by one from the feeding port 11A. The paper feed roller 21 feeds the document D along the feeding guide 16.

The conveyance unit 20 includes a feed roller pair 22. The feed roller pair 22 is provided downstream in the conveyance direction Y from the paper feed roller 21. The feed roller pair 22 includes a feed driving roller 22A and a feed separation roller 22B. The feed driving roller 22A and the feed separation roller 22B are provided to sandwich the conveyance path 14 therebetween. The feed driving roller 22A is rotated by a driving force that is transmitted from the first driving unit 25, which will be described below. That is, the feed driving roller 22A is configured to be driven by the first driving unit 25, which will be described below. The feed separation roller 22B is rotated by a driving force that is transmitted from a second driving unit 26, which will be described below. That is, the feed separation roller 22B is configured to be driven by the second driving unit 26, which will be described below.

The conveyance unit 20 includes a conveyance roller pair 23. The conveyance roller pair 23 is provided downstream in the conveyance direction Y from the feed roller pair 22. The conveyance roller pair 23 is provided upstream in the conveyance direction Y from the reading area SA. The conveyance roller pair 23 conveys the document D before reading to the reading area SA.

The conveyance roller pair 23 includes a conveyance driving roller 23A and a conveyance driven roller 23B. The conveyance driving roller 23A and the conveyance driven roller 23B are provided to sandwich the conveyance path 14 therebetween. The conveyance driving roller 23A is rotated by a driving force that is transmitted from the second driving unit 26, which will be described below. That is, the conveyance driving roller 23A is configured to be driven by the second driving unit 26, which will be described below. The conveyance driven roller 23B rotates together with the rotation of the conveyance driving roller 23A.

The conveyance unit 20 includes an ejection roller pair 24. The ejection roller pair 24 is provided downstream in the conveyance direction Y from the conveyance roller pair 23. The ejection roller pair 24 is provided downstream in the conveyance direction Y from the reading area SA. The ejection roller pair 24 ejects the read document D to the outside of the housing 11. The ejection roller pair 24 is configured to convey the document D being read together with the conveyance roller pair 23.

The ejection roller pair 24 includes an ejection driving roller 24A and an ejection driven roller 24B. The ejection driving roller 24A and the ejection driven roller 24B are provided to sandwich the conveyance path 14 therebetween. The ejection driving roller 24A is rotated by a driving force that is transmitted from the second driving unit 26, which will be described below. That is, the ejection driving roller 24A is configured to be driven by the second driving unit 26, which will be described below. The ejection driven roller 24B rotates together with the rotation of the ejection driving roller 24A.

The conveyance unit 20 includes the first driving unit 25. The first driving unit 25 is a drive source for the paper feed roller 21 and the feed driving roller 22A. The first driving unit 25 rotates the paper feed roller 21 and the feed driving roller 22A. The first driving unit 25 may be, for example, a DC motor.

The conveyance unit 20 includes the second driving unit 26. The second driving unit 26 is a drive source for the feed separation roller 22B, the conveyance driving roller 23A, and the ejection driving roller 24A. The second driving unit 26 rotates the feed separation roller 22B, the conveyance driving roller 23A, and the ejection driving roller 24A. The second driving unit 26 may be, for example, a DC motor. That is, the image reading device 10 includes a DC motor.

The image reading device 10 includes a position detection unit 27. The position detection unit 27 may be capable of detecting a rotational position of the conveyance driving roller 23A, but may also be capable of detecting the rotational position of either the feed separation roller 22B or the ejection driving roller 24A. The position detection unit 27 may be an encoder, for example.

The image reading device 10 may include one or more detection units that perform detection regarding image reading. In particular, the image reading device 10 may include one or more detection units that performs detection regarding the document D.

Specifically, the image reading device 10 includes a first document detection unit 28. The first document detection unit 28 is provided upstream in the conveyance direction Y of the paper feed roller 21. The first document detection unit 28 can detect the presence or absence of the document D placed on the document support 15. The first document detection unit 28 may be, for example, a contact sensor having a lever or the like, or may be a non-contact sensor such as an optical sensor.

The image reading device 10 includes a second document detection unit 29. The second document detection unit 29 is provided along the conveyance path 14. The second document detection unit 29 is provided downstream in the conveyance direction Y from the feed roller pair 22. The second document detection unit 29 is provided upstream in the conveyance direction Y from the conveyance roller pair 23. The second document detection unit 29 can detect carrier sheets sandwiching the document D. The second document detection unit 29 can also detect the presence or absence of the document D in the conveyance path 14. The second document detection unit 29 may be, for example, a contact sensor having a lever or the like, or may be a non-contact sensor such as an optical sensor.

The image reading device 10 includes a third document detection unit 30. The third document detection unit 30 is provided along the conveyance path 14. The third document detection unit 30 is provided downstream in the conveyance direction Y from the conveyance roller pair 23. The third document detection unit 30 is provided upstream in the conveyance direction Y from the reading area SA. The third document detection unit 30 can detect the presence or absence of the document D. In particular, the third document detection unit 30 can also detect the presence or absence of the document D in the conveyance path 14. The third document detection unit 30 may be, for example, a contact sensor having a lever or the like, or may be a non-contact sensor such as an optical sensor.

Reading Unit 31

The image reading device 10 includes a reading unit 31. The reading unit 31 is housed in the housing 11. The reading unit 31 is provided downstream in the conveyance direction Y of the conveyance roller pair 23. The reading unit 31 is provided upstream in the conveyance direction Y of the ejection roller pair 24. The reading unit 31 is configured to read an image from the document D conveyed along the conveyance path 14. That is, the reading unit 31 can read an image from the document D that is conveyed by various rollers.

The reading unit 31 may include a first reading unit 31A and a second reading unit 31B. The first reading unit 31A and the second reading unit 31B are provided to sandwich the conveyance path 14 therebetween. The first reading unit 31A and the second reading unit 31B are arranged at positions slightly shifted in the conveyance direction Y from each other. The first reading unit 31A is configured to read an image from a surface of the document D. The second reading unit 31B is configured to read an image from a back side of the document D.

The first reading unit 31A includes a first light source 32A. The first light source 32A can irradiate the reading area SA with light. The first light source 32A can irradiate the document D being conveyed in the reading area SA with light. The first light source 32A may be configured of an LED or a fluorescent lamp, for example.

The first reading unit 31A includes a first image sensor 33A. The first image sensor 33A can read the image from the document D being conveyed in the reading area SA. The first image sensor 33A photoelectrically converts the received light. The first image sensor 33A outputs an output signal having a value according to an amount of received light. The first image sensor 33A may be a contact type image sensor. The first image sensor 33A may be a CMOS image sensor.

The first image sensor 33A may be a monochrome sensor or may be a color sensor. The first reading unit 31A may be configured to read the document D in full color. The first reading unit 31A may be configured to read the document D in three colors of RGB. The first reading unit 31A may be configured to read the document D in grayscale.

The first reading unit 31A includes a first background plate 34A. The first background plate 34A is provided at a position facing a second light source 32B and a second image sensor 33B, which will be described below. The first background plate 34A reflects light emitted from the second light source 32B and causes the light to be incident on the second image sensor 33B. The first background plate 34A is read together with the document D by the second image sensor 33B. The first background plate 34A is read as a background together with the document D by the second image sensor 33B. The first background plate 34A may be white or may be gray.

The second reading unit 31B includes the same functions as the first reading unit 31A. Therefore, detailed description of the second reading unit 31B is omitted. The second reading unit 31B includes a second light source 32B, a second image sensor 33B, and a second background plate 34B. The second light source 32B has the same function as the first light source 32A. The second image sensor 33B has the same function as the first image sensor 33A. The second background plate 34B has the same function as the first background plate 34A.

Hereinafter, the first light source 32A and the second light source 32B may be collectively shown as the light source 32 in some cases. The first image sensor 33A and the second image sensor 33B may be collectively referred to as the image sensor 33 in some cases. The first background plate 34A and the second background plate 34B may be collectively referred to as a background plate 34 in some cases.

Control Unit 40

The image reading device 10 includes a control unit 40. The control unit 40 may centrally control the image reading device 10 and control various operations that are executed by the image reading device 10. That is, the control unit 40 performs control regarding image reading. The control unit 40 includes one or more processors that execute various processes according to a program, one or more dedicated hardware circuits such as application-specific integrated circuits that execute at least some of various processes, or a combination of these. The processor includes a CPU and a memory, such as a RAM and a ROM, and stores program code or instructions configured to cause the CPU to execute processes. The memory or a computer-readable medium includes any readable media that can be accessed by a general purpose or special purpose computer.

Electrical Configuration of Image Reading Device 10

Here, an electrical configuration of the image reading device 10 will be described with reference to FIG. 2.

Figure 2:
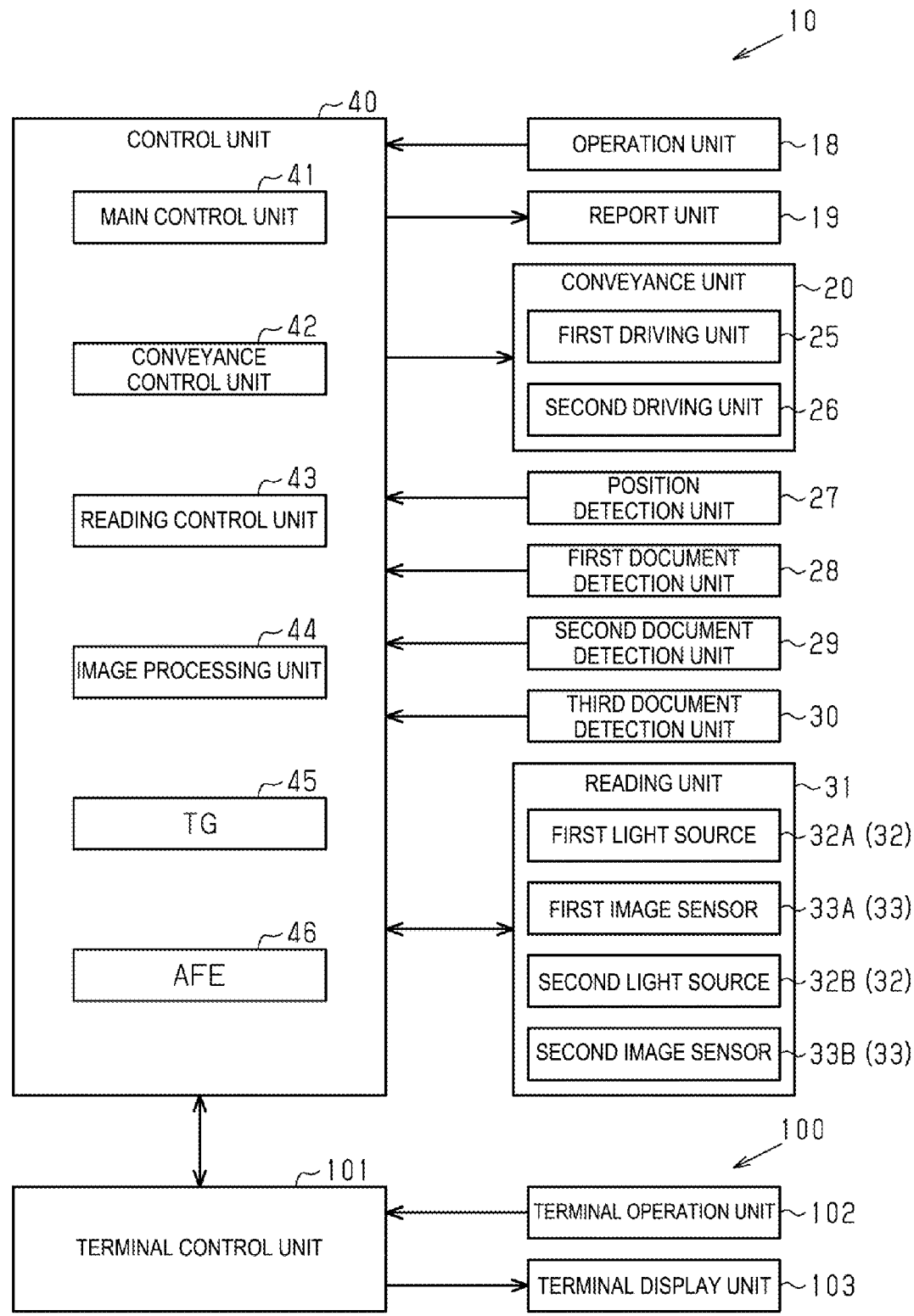
FIG. 2 is a block diagram illustrating an electrical configuration of the image reading device.

As illustrated in FIG. 2, the image reading device 10 includes an operation unit 18. The operation unit 18 can be operated by a user from the outside of the housing 11. The operation unit 18 may include at least one of a power switch, a start switch, a stop switch, and a setting switch.

The image reading device 10 includes a report unit 19. The report unit 19 can report predetermined information. The report unit 19 may include at least one of a display unit that displays an image, an audio output unit that outputs audio, and a light emitting unit that emits light. The operation unit 18 and the report unit 19 may be provided separately, or may be provided integrally, like a touch panel or the like.

The control unit 40 is connected to the operation unit 18, the report unit 19, the first driving unit 25, the second driving unit 26, the position detection unit 27, the first document detection unit 28, the second document detection unit 29, the third document detection unit 30, and the reading unit 31. The control unit 40 can receive signals from the operation unit 18, the position detection unit 27, the first document detection unit 28, the second document detection unit 29, the third document detection unit 30, and the reading unit 31. The control unit 40 can output signals to the report unit 19, the first driving unit 25, the second driving unit 26, and the reading unit 31.

In particular, the control unit 40 controls the reading unit 31 so that the reading unit 31 reads an image from the document D in response to input of a reading instruction. Specifically, the control unit 40 can control driving of the first driving unit 25. The control unit 40 can control driving of the second driving unit 26. The control unit 40 controls the reading unit 31 so that the reading unit 31 reads an image from the document D conveyed by the conveyance unit 20.

The control unit 40 includes various functional units that function by executing a program. Specifically, the control unit 40 includes a main control unit 41, a conveyance control unit 42, a reading control unit 43 and an image processing unit 44. The main control unit 41 centrally controls the image reading device 10.

The conveyance control unit 42 controls conveyance of the document D along the conveyance path 14. The conveyance control unit 42 drives and controls the first driving unit 25 and the second driving unit 26 according to an instruction from the main control unit 41.

In particular, the conveyance control unit 42 may drive and control the first driving unit 25 and the second driving unit 26 so that the first driving unit 25 and the second driving unit 26 convey the document D at a conveyance velocity corresponding to the reading resolution. As a specific example, the conveyance control unit 42 conveys the document D at a higher velocity when the reading resolution is 300 dpi that is relatively low, as compared with a case in which the reading resolution is 600 dpi that is relatively high.

The reading control unit 43 controls the reading unit 31 via a timing generator 45 which will be described below. In particular, the reading control unit 43 controls light emission of the light source 32. The reading control unit 43 controls the image sensor 33 to perform a read operation. Accordingly, the reading control unit 43 performs control for causing the reading unit 31 to reads an image of the document D.

The image processing unit 44 processes image data of the image read by the reading unit 31. In particular, the image processing unit 44 can correct the image data based on a result of analyzing the read image data. The image processing unit 44 outputs the corrected image data to the terminal device 100.

The control unit 40 includes a timing generator 45. In the figure, the timing generator 45 is denoted by TG. The timing generator 45 outputs a pulse signal indicating reading operation timing to the reading unit 31. The control unit 40 has an analog front end 46. In the figure, the analog front end 46 is indicated as AFE. The analog front end 46 converts a pixel signal from the image sensor 33 from an analog signal to a digital signal.

The image reading device 10 is communicatively coupled to the terminal device 100. The image reading device 10 may be coupled to the terminal device 100 by wire or wirelessly. The terminal device 100 may be, for example, a personal computer, but may also be a mobile terminal device.

The terminal device 100 includes a terminal control unit 101. The terminal control unit 101 may centrally control the terminal device 100 and control various operations that are executed by the terminal device 100. The terminal device 100 is communicatively coupled to the image reading device 10 that controls image reading. That is, it can be said that the terminal control unit 101 performs control regarding image reading.

The terminal device 100 includes a terminal operation unit 102 and a terminal display unit 103. The terminal operation unit 102 can be operated by a user. That is, the terminal operation unit 102 can receive instructions from the user. The terminal display unit 103 is configured to display images.

Drive Control by Control Unit 40

Here, drive control by the control unit 40 will be described. In particular, the drive control of the second driving unit 26 will be mainly described, but the drive control of the second driving unit 26 can also be executed in the same manner.

The control unit 40 is configured to control the second driving unit 26 through feedback control based on the velocity control data. The velocity control data is data for defining a velocity profile. The velocity profile is data that defines a target rotation velocity of the second driving unit 26. The velocity control data are stored in the memory of the control unit 40.

Specifically, the control unit 40 acquires an actual rotation velocity of the second driving unit 26 based on a reception interval of a signal from the position detection unit 27. The control unit 40 acquires the target rotation velocity corresponding to the rotation position of the second driving unit 26 based on the velocity control data.

The control unit 40 calculates a command value so that the actual rotation velocity corresponding to the rotational position of the second driving unit 26 approaches the target rotation velocity. The command value may be, for example, a PWM command value. The control unit 40 outputs a current corresponding to the calculated command value to the second driving unit 26 as a drive signal. Accordingly, the control unit 40 drives the second driving unit 26 by a driving amount corresponding to the command value. Thus, the control unit 40 can control the second driving unit 26 along the velocity profile based on the velocity control data.

The control unit 40 acquires a power load value of the second driving unit 26. Specifically, the control unit 40 acquires the power load value based on a current value output to the second driving unit 26. In particular, the control unit 40 may acquire the power load value based on a duty ratio of a current output to the second driving unit 26 according to the PWM command value. The control unit 40 may acquire the power load value based on the PWM command value. The power load value decreases as the actual rotation velocity of the second driving unit 26 approaches the target rotation velocity, and increases as the actual rotation velocity of the second driving unit 26 moves away from the target rotation velocity. Thus, the control unit 40 can detect the power load value of the second driving unit 26.

Threshold Value of Power Load Value

Here, a relationship between a rotation velocity of the second driving unit 26 and the power load value of the second driving unit 26 will be described with reference to FIG. 3.

Figure 3:
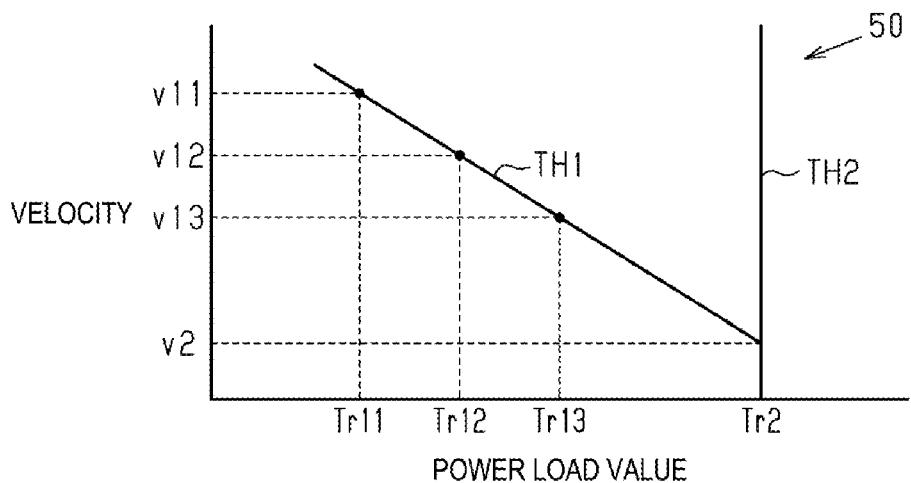
FIG. 3 is a schematic diagram illustrating a threshold value of a power load value of a second driving unit.

As illustrated in FIG. 3, a graph 50 is a graph in which the rotation velocity of the second driving unit 26 is assigned to a vertical axis and the power load value of the second driving unit 26 is assigned to a horizontal axis. The graph 50 is a graph showing a first threshold value TH1. The graph 50 is a graph showing a second threshold value TH2.

The first threshold value TH1 is a threshold value for determining that an abnormality is likely to occur in driving the second driving unit 26 at a current rotation velocity, but an abnormality is not likely to occur in driving the second driving unit 26 at a rotation velocity lower than the current rotation velocity. The first threshold value TH1 is a threshold value of the power load value of the second driving unit 26 with respect to the rotation velocity of the second driving unit 26. The power load value of the second driving unit 26 is determined to correspond to the rotation velocity of the second driving unit 26 as the first threshold value TH1. In particular, the first threshold value TH1 is inversely proportional to the rotation velocity of the second driving unit 26. That is, when the rotation velocity of the second driving unit 26 is lower, the first threshold value TH1 increases.

As a specific example, when the rotation velocity of the second driving unit 26 is a velocity v11, the first threshold value TH1 becomes a value Tr11 as the power load value of the second driving unit 26. When the rotation velocity of the second driving unit 26 is a velocity v12 that is lower than the velocity v11, the first threshold value TH1 becomes a value Tr12 as the power load value of the second driving unit 26. The value Tr12 is a value greater than the value Tr11. When the rotation velocity of the second driving unit 26 is a velocity v13 that is lower than the velocity v12, the first threshold value TH1 becomes a value Tr13 as the power load value of the second driving unit 26. The value Tr13 is a value greater than the value Tr12.

The second threshold value TH2 is a threshold value for determining that an abnormality is likely to occur in driving of the second driving unit 26. In particular, the second threshold value TH2 is also a threshold value for determining that an abnormality is likely to occur in driving of the second driving unit 26 even when the rotation velocity is reduced, unlike the first threshold value TH1. The second threshold value TH2 is an absolute threshold value of the power load value of the second driving unit 26. The second threshold value TH2 is determined preferentially over the first threshold value TH1. The second threshold value TH2 is a constant value Tr2 that is determined in advance as the power load value of the second driving unit 26 regardless of the rotation velocity of the second driving unit 26. Moreover, it can be said that the second threshold value TH2 is a value greater than the first threshold value TH1. Further, an intersection between the first threshold value TH1 and the second threshold value TH2 is a velocity v2.

Power Load Detection Process

Here, the power load detection process will be described with reference to FIG. 4. The power load detection process is a process that is executed by the control unit 40 in each predetermined period. Here, an order of each process can be arbitrarily changed without departing from the purpose of each process.

Figure 4:
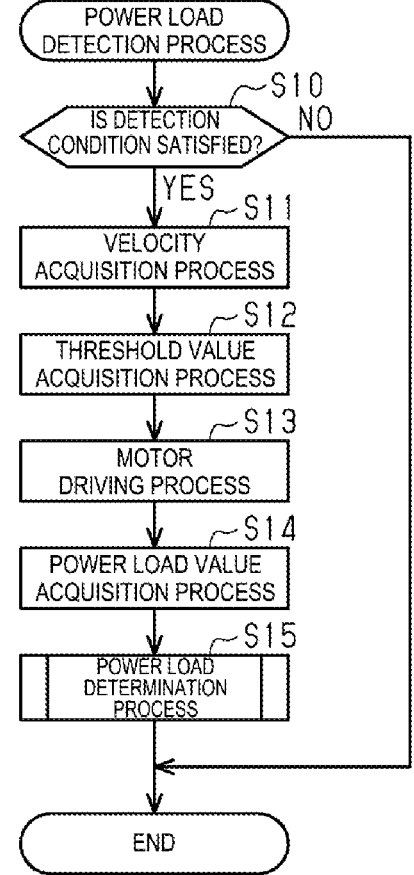
FIG. 4 is a flowchart illustrating a power load detection process.

As illustrated in FIG. 4, in step S10, the control unit 40 determines whether or not the detection condition is satisfied. The detection condition includes a first detection condition, a second detection condition, and a third detection condition. The control unit 40 determines that the detection condition has been satisfied when at least one of the first detection condition, the second detection condition, and the third detection condition is satisfied.

The first detection condition may be satisfied after power-on. That is, the first detection condition may be satisfied when power is turned on. The second detection condition may be satisfied when a reading instruction is input. That is, the second detection condition may be satisfied before the image is read from the document D when the reading instruction is input. The third detection condition may be satisfied while the plurality of documents D are being read after the reading instruction is input. That is, when the first document and the second document next to the first document are conveyed, the third detection condition may be satisfied in a period of time after an image is read from the first document and before an image is read from the second document, after the reading instruction is input. In other words, the third detection condition may be satisfied in a period in which images are read from the plurality of documents D after a reading instruction is input.

The control unit 40 may executes a predetermined process and then determine that the first detection condition has been satisfied, after power-on. That is, the control unit 40 may determine that the first detection condition is satisfied when power is turned on. When the reading instruction is input, the control unit 40 may determine that the second detection condition has been satisfied before a leading edge of the document D is detected, based on a detection result of the third document detection unit 30. The control unit 40 may determine that the third detection condition has been satisfied when a trailing edge of the document D is detected, based on the detection result of the third document detection unit 30. The control unit 40 may determine that the third detection condition has been satisfied when a predetermined time has elapsed after the trailing edge of the document D is detected, based on the detection result of the third document detection unit 30.

When the control unit 40 determines that the detection condition is not satisfied, the control unit 40 ends the power load detection process. On the other hand, when the control unit 40 determines that the detection condition has been satisfied, the process proceeds to step S11.

In step S11, the control unit 40 executes a velocity acquisition process. In this process, the control unit 40 acquires a first rotation velocity as the rotation velocity of the second driving unit 26. The first rotation velocity is a rotation velocity corresponding to the first conveyance velocity as a conveyance velocity of the document D. The first rotation velocity may be a predetermined rotation velocity. In this case, the first rotation velocity may be a rotation velocity corresponding to a highest conveyance velocity of the image reading device 10. The first rotation velocity may be a rotation velocity corresponding to the conveyance velocity of the image reading device 10 included in the reading instruction when the second detection condition or the third detection condition has been satisfied. When this process ends, the control unit 40 causes the process to proceed to step S12.

In step S12, the control unit 40 executes a threshold value acquisition process. In this process, the control unit 40 acquires the first threshold value TH1 corresponding to the first rotation velocity acquired in step S11. Further, the control unit 40 acquires the second threshold value TH2 regardless of the first rotation velocity. When this process ends, the control unit 40 causes the process to proceed to step S13.

In step S13, the control unit 40 executes a motor driving process. In this process, the control unit 40 drives the second driving unit 26 at the first rotation velocity acquired in step S11. In particular, the control unit 40 drives the second driving unit 26 at the first rotation velocity based on the signal from the position detection unit 27. When the first detection condition is satisfied, the control unit 40 may execute the motor driving process as an initial operation process when power is turned on. When the third detection condition is satisfied, the control unit 40 may execute the motor driving process as a process of conveying the document D according to the reading instruction. When this process ends, the control unit 40 causes the process to proceed to step S14.

In step S14, the control unit 40 executes a power load value acquisition process. In this process, the control unit 40 acquires the power load value of the second driving unit 26 based on the current value output to the second driving unit 26. When this process ends, the control unit 40 causes the process to proceed to step S15.

In step S15, the control unit 40 executes a power load determination process. Although details will be described below, the control unit 40 in this process determines the power load value of the second driving unit 26 acquired in step S14 based on the first threshold value TH1 and the second threshold value TH2 acquired in step S12. When this process ends, the control unit 40 ends the power load detection process.

Power Load Determination Process

Next, the power load determination process will be described with reference to FIG. 5.

Figure 5:
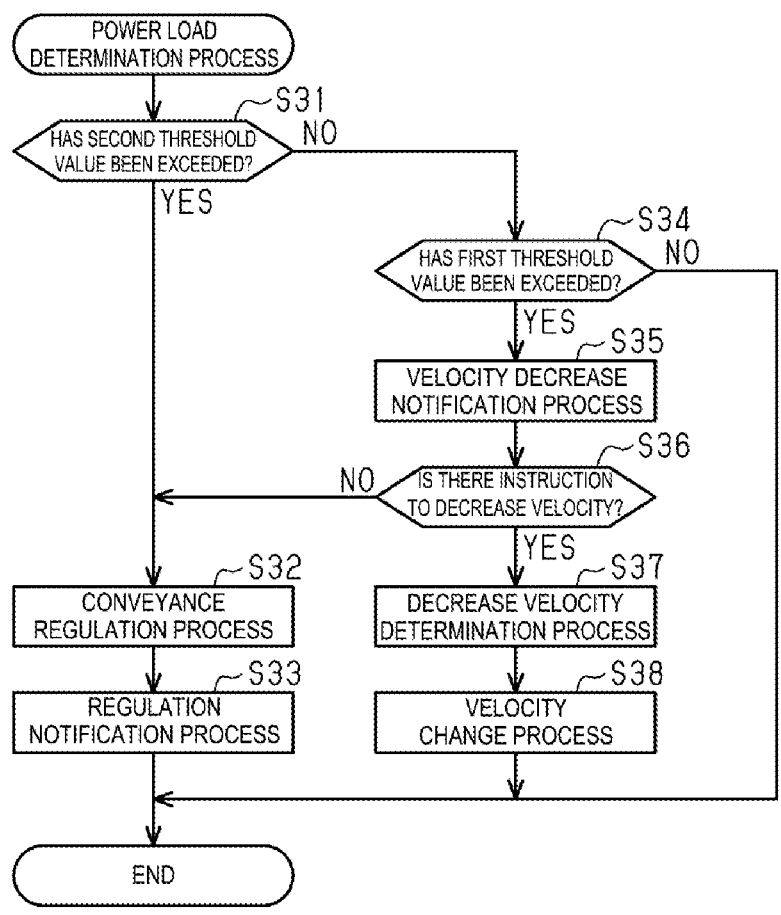
FIG. 5 is a flowchart illustrating a power load determination process.

As illustrated in FIG. 5, in step S31, the control unit 40 determines whether or not the power load value of the second driving unit 26 acquired in step S14 exceeds the second threshold value TH2. When the control unit 40 determines that the power load value of the second driving unit 26 has exceeded the second threshold value TH2, the process proceeds to step S32. On the other hand, when the control unit 40 determines that the power load value of the second driving unit 26 does not exceed the second threshold value TH2, the process proceeds to step S34.

In step S32, the control unit 40 executes a conveyance regulation process. In this process, the control unit 40 stores information for regulating the conveyance of the document D in the memory. Accordingly, the control unit 40 restricts reading of an image from the document D. Specifically, when the second detection condition or the third detection condition has been satisfied, the control unit 40 stops reading the image in response to the reading instruction. When this process ends, the control unit 40 causes the process to proceed to step S33.

Thus, the control unit 40 determines that the power load value of the second driving unit 26 has exceeded the second threshold value TH2 in a state in which the control unit 40 controls the second driving unit 26 so that the second driving unit 26 conveys the document D at the first conveyance velocity, and then, controls the second driving unit 26 to restrict the conveyance of the document D.

In step S33, the control unit 40 executes a regulation notification process. In this process, the control unit 40 causes the report unit 19 to report the information indicating conveyance restriction. Specifically, the control unit 40 causes the display unit to display the information indicating conveyance restriction. The control unit 40 may cause the display unit to display information for prompting the user to contact a support center. The control unit 40 may cause the display unit to display information for prompting repair of the image reading device 10 and re-purchase of the image reading device 10. When this process ends, the control unit 40 ends the power load determination process.

In step S34, the control unit 40 determines whether or not the power load value of the second driving unit 26 acquired in step S14 exceeds the first threshold value TH1. When the control unit 40 determines that the power load value of the second driving unit 26 has exceeded the first threshold value TH1, the process proceeds to step S35. On the other hand, when the control unit 40 determines that the power load value of the second driving unit 26 does not exceed the first threshold value TH1, the control unit 40 ends the power load determination process. That is, the control unit 40 controls the second driving unit 26 so that the document D can be conveyed at the first conveyance velocity.

In step S35, the control unit 40 executes a velocity decrease notification process. In this process, the control unit 40 causes the report unit 19 to notify the selection information. Specifically, the control unit 40 causes the display unit to display the selection information. The selection information may be information for allowing the user to select whether to convey the document D at a second conveyance velocity. The selection information may be information for allowing the user to select whether to reduce the conveyance velocity. The second conveyance velocity is a conveyance velocity lower than the first conveyance velocity. The second conveyance velocity may be a conveyance velocity lower than the first conveyance velocity by a predetermined velocity. The second conveyance velocity may be higher than a velocity v2. The second conveyance velocity may be the same velocity as the velocity v2. The second conveyance velocity may be lower than the velocity v2. When this process ends, the control unit 40 causes the process to proceed to step S36.

Thus, when the control unit 40 determines that the power load value of the second driving unit 26 exceeds the first threshold value TH1 in a state in which the control unit 40 controls the second driving unit 26 so that the second driving unit 26 conveys the document D at the first conveyance velocity, the control unit 40 causes the display unit to display the selection information.

In step S36, the control unit 40 waits for an instruction from the user and determines whether or not the instruction from the user is an instruction to decrease the conveyance velocity. When the control unit 40 determines that the instruction from the user is not the instruction to decrease the conveyance velocity, the process proceeds to step S32. That is, the control unit 40 regulates the conveyance of the document D when not conveying the document D at the second conveyance velocity is selected. On the other hand, when the control unit 40 determines that the instruction from the user is the instruction to decrease the conveyance velocity, the process proceeds to step S37.

In step S37, the control unit 40 executes a decrease velocity determination process. In this process, the control unit 40 determines the second conveyance velocity as a conveyance velocity of the document D. When this process ends, the control unit 40 causes the process to proceed to step S38.

In step S38, the control unit 40 executes a velocity change process. In this process, the control unit 40 stores, in the memory, information indicating that the conveyance velocity of the document D is the second conveyance velocity. That is, the control unit 40 can control the second driving unit 26 so that the second driving unit 26 conveys the document D at the second conveyance velocity when conveying the document D at the second conveyance velocity is selected. When this process ends, the control unit 40 ends the power load determination process.

Accordingly, when the first detection condition is satisfied, the control unit 40 detects the power load value of the second driving unit 26 in a state in which the control unit 40 controls the second driving unit 26 so that the second driving unit 26 conveys the document D at the first conveyance velocity. The control unit 40 determines that the power load value of the second driving unit 26 exceeds the first threshold value TH1, and then, can control the second driving unit 26 so that the second driving unit 26 conveys the document D at the second conveyance velocity when the reading instruction is input.

Specifically, the control unit 40 drives the second driving unit 26 at the second rotation velocity based on the signal from the position detection unit 27. The second rotation velocity is a rotation velocity corresponding to the second conveyance velocity. The control unit 40 causes the reading unit 31 to read an image from the document D at a reading operation timing corresponding to the second conveyance velocity.

Further, the control unit 40 detects the power load value of the second driving unit 26 in a state in which the control unit 40 controls the second driving unit 26 so that the second driving unit 26 conveys the document D at the first convey-ance velocity when the second detection condition is satisfied. The control unit 40 determines that the power load value of the second driving unit 26 exceeds the first threshold value TH1, and then, can control the second driving unit 26 so that the second driving unit 26 conveys the document D at the second conveyance velocity.

Further, the control unit 40 detects the power load value of the second driving unit 26 in a state in which the control unit 40 controls the second driving unit 26 so that the second driving unit 26 conveys the document D at the first conveyance velocity when the third detection condition has been satisfied. The control unit 40 determines that the power load value of the second driving unit 26 exceeds the first threshold value TH1, and then, can control the second driving unit 26 so that the second driving unit 26 conveys the document D at the second conveyance velocity.

Thus, the control unit 40 determines that the power load value of the second driving unit 26 exceeds the first threshold value TH1 in a state in which the control unit 40 controls the second driving unit 26 so that the second driving unit 26 conveys the document D at the first conveyance velocity, and then, can control the second driving unit 26 so that the second driving unit 26 conveys the document D at the second conveyance velocity.

Actions and Effects of First Embodiment

Actions and effects of the first embodiment will be described.

(1-1) The control unit 40 can detect the power load value of the second driving unit 26. The control unit 40 determines that the power load value of the second driving unit 26 exceeds the first threshold value TH1 in a state in which the control unit 40 controls the second driving unit 26 so that the second driving unit 26 conveys the document D at the first conveyance velocity, and then, can control the second driving unit 26 so that the second driving unit 26 conveys the document D at the second conveyance velocity lower than the first conveyance velocity. In the related art, the power load of the second driving unit 26 increases when the deterioration of the second driving unit 26, such as wear of bearings of the second driving unit 26, progresses. In such a case, in order to convey the document D at the same conveyance velocity, the current value output to the second driving unit 26 increases, resulting in an increase in power consumption. Accordingly, the image reading device 10 becomes nonavailable due to, for example, a failure of second driving unit 26. Of course, it is not preferable to use the image reading device 10 under different conditions even when this is authorized under each law. Further, a case in which the image reading device 10 cannot be used appropriately in some cases due to an increase in power consumption depending on a power supply scheme such as universal serial bus (USB) power supply is also considered. Therefore, with the above configuration, even when the power load value of the second driving unit 26 exceeds the first threshold value TH1 due to aged deterioration of the second driving unit 26, it is possible to curb aging deterioration of the second driving unit 26 by conveying the document D at the second conveyance velocity lower than the first conveyance velocity. Therefore, it is possible to extend a timing itself at which the image reading device 10 becomes nonavailable, and to improve the convenience for the user.

(1-2) The control unit 40 determines that the power load value of the second driving unit 26 exceeds the first threshold value TH1 when power is turned on, and then can control the second driving unit 26 so that the second driving unit 26 conveys the document D at the second conveyance velocity when the reading instruction is input. Therefore, when the power load value of the second driving unit 26 exceeds the first threshold value TH1 due to aged deterioration of the second driving unit 26 when power is turned on, and then, a reading instruction is input, it is possible to curb aging deterioration of the second driving unit 26 by conveying the document D at the second conveyance velocity. Therefore, it is possible to extend the timing itself at which the image reading device 10 becomes nonavailable, and to improve the convenience for the user.

(1-3) When the reading instruction is input, the control unit 40 detects the power load value of the second driving unit 26 in a state in which the control unit 40 controls the second driving unit 26 so that the second driving unit 26 conveys the document D at the first conveyance velocity, before causing the reading unit 31 to read the image from the document D. Therefore, it is possible to early specify that the power load value of the second driving unit 26 has exceeded the first threshold value TH1 due to aging deterioration of the second driving unit 26. Therefore, it is possible to extend the timing itself at which the image reading device 10 becomes nonavailable, and to improve the convenience for the user.

(1-4) The control unit 40 detects the power load value of the second driving unit 26 in a state in which the control unit 40 controls the second driving unit 26 so that the second driving unit 26 conveys the document D at the first conveyance velocity in the period in which images are read from the plurality of documents D after a reading instruction is input. Therefore, it is possible to early specify that the power load value of the second driving unit 26 has exceeded the first threshold value TH1 due to aging deterioration of the second driving unit 26. Therefore, it is possible to extend the timing itself at which the image reading device 10 becomes nonavailable, and to improve the convenience for the user.

(1-5) The control unit 40 determines that the power load value of the second driving unit 26 has exceeded the second threshold value TH2 greater than the first threshold value TH1 in a state in which the control unit 40 controls the second driving unit 26 so that the second driving unit 26 conveys the document D at the first conveyance velocity, and restricts the conveyance of the document D. Therefore, it is possible to determine the power load value of the second driving unit 26 using both the first threshold value TH1 and the second threshold value TH2 greater than the first threshold value TH1. This makes it possible to diversify control content according to the power load value of the second driving unit 26. In particular, when the power load value of the second driving unit 26 exceeds the second threshold value TH2, the conveyance of the document D is restricted. Therefore, it is possible to curb defects upon conveyance of the document D in advance, and improve the convenience for the user.

(1-6) When the control unit 40 determines that the power load value of the second driving unit 26 has exceeded the first threshold value TH1 in a state in which the control unit 40 controls the second driving unit 26 so that the second driving unit 26 conveys the document D at the first conveyance velocity, the control unit 40 causes the display unit to display the selection information. Therefore, it is possible to provide an opportunity to cause the user to select whether to convey the document D at the second conveyance velocity lower than the first conveyance velocity when a determination is made that the power load value of the second driving unit 26 exceeds the first threshold value TH1. Therefore, it is possible to improve the convenience for the user.

(1-7) The control unit 40 can control the second driving unit 26 so that the second driving unit 26 conveys the document D at the second conveyance velocity when conveying the document D at the second conveyance velocity is selected. The control unit 40 regulates the conveyance of the document D when not conveying the document D at the second conveyance velocity is selected. Therefore, it is possible to provide the user with an opportunity to select whether to convey the document D at the second conveyance velocity. Therefore, it is possible to improve the convenience for the user.

Second Embodiment

Next, a second embodiment will be described. In the second embodiment, a determination is also made as to whether or not the power load value of the second driving unit 26 exceeds a third threshold value TH3. In the following description, the same configurations as those of the already described embodiments are denoted by the same reference signs, and redundant descriptions thereof will be omitted or simplified.

Threshold Value of Power Load Value

Figure 6:
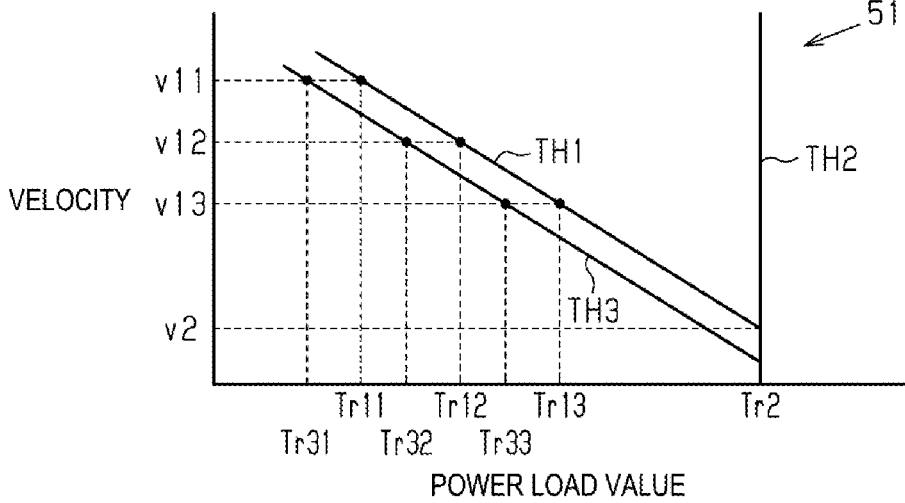
FIG. 6 is a schematic diagram illustrating a threshold value of the power load value of the second driving unit.

As illustrated in FIG. 6, a graph 51 is also a graph showing the third threshold value TH3, unlike the graph 50. The third threshold value TH3 is a threshold value for determining that an abnormality is likely to occur in driving of the second driving unit 26 over time even though the abnormality is less likely to occur in driving of the second driving unit 26. The third threshold value TH3 is a threshold value at which the life of the second driving unit 26 can be extended at the rotation velocity lower than the current rotation velocity. That is, the third threshold value TH3 is a threshold value for recommending a rotation velocity lower than the current rotation velocity. The third threshold value TH3 is a threshold value having the same tendency as the first threshold value TH1, but has a power load value smaller than the first threshold value TH1.

As a specific example, when the rotation velocity of the second driving unit 26 is the velocity v11, the third threshold value TH3 is a value Tr31 as the power load value of the second driving unit 26. The value Tr31 is a value smaller than the value Tr11. When the rotation velocity of the second driving unit 26 is the velocity v12, the third threshold value TH3 becomes a value Tr32 as the power load value of the second driving unit 26. The value Tr32 is a value smaller than the value Tr12. When the rotation velocity of the second driving unit 26 is the velocity v13, the third threshold value TH3 becomes a value Tr33 as the power load value of the second driving unit 26. The value Tr33 is a value smaller than the value Tr13. Thus, it can be said that the third threshold value TH3 is a value smaller than the first threshold value TH1.

Power Load Determination Process

Figure 7:
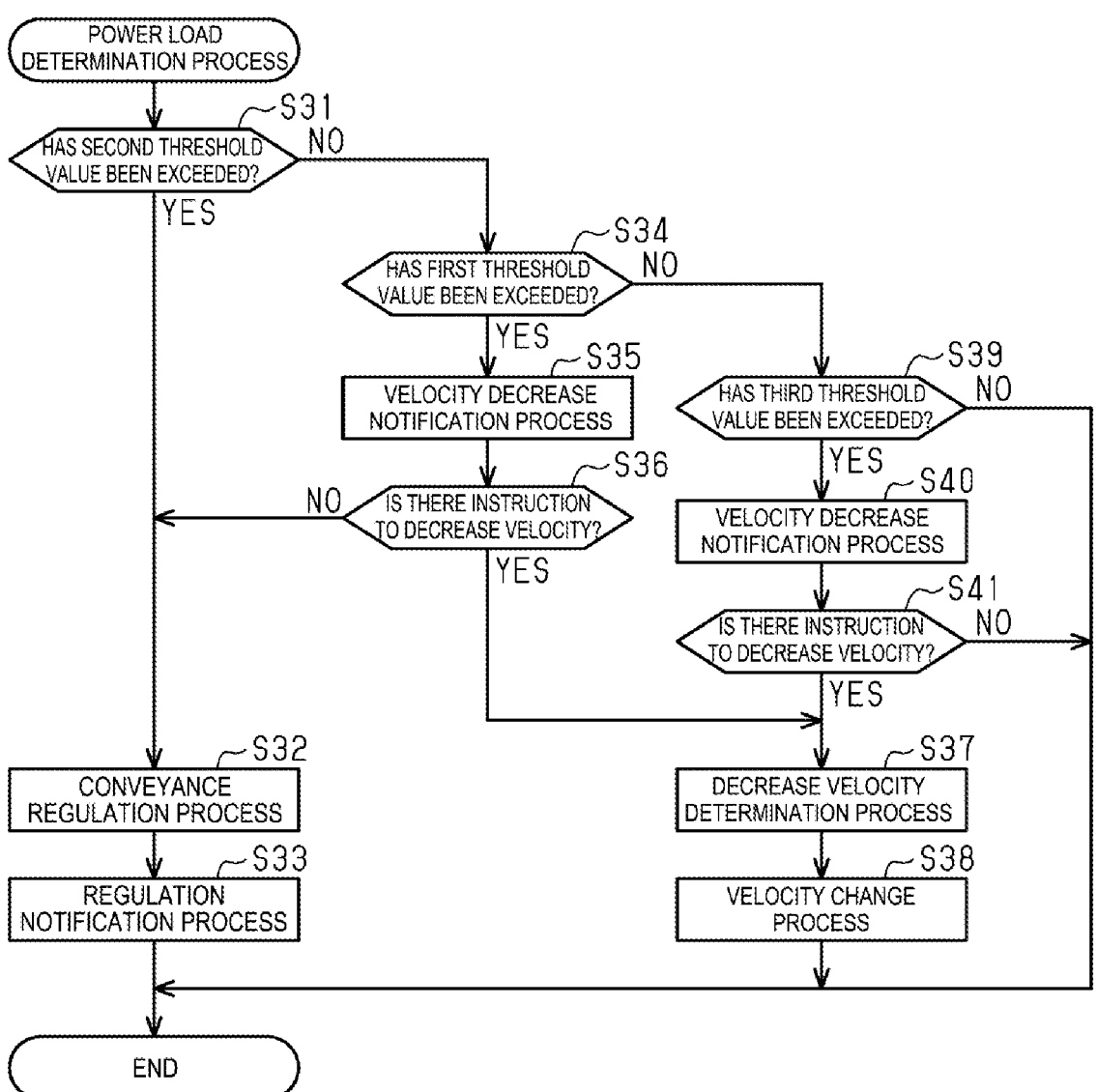
FIG. 7 is a flowchart illustrating a power load determination process.

As illustrated in FIG. 7, in the power load determination process, when the control unit 40 determines in step S34 that the power load value of the second driving unit 26 does not exceed the first threshold value TH1, the process proceeds to step S39. In step S39, the control unit 40 determines whether or not the power load value of the second driving unit 26 acquired in step S14 has exceeded the third threshold value TH3. When the control unit 40 determines that the power load value of the second driving unit 26 has exceeded the third threshold value TH3, the process proceeds to step S40. On the other hand, when the control unit 40 determines that the power load value of the second driving unit 26 does not exceed the third threshold value TH3, the control unit 40 ends the power load determination process. That is, the control unit 40 controls the second driving unit 26 so that the document D can be conveyed at the first conveyance velocity.

In step S40, the control unit 40 executes a velocity decrease notification process, as in step S35. In step S41, when the control unit 40 determines that the instruction from the user is the instruction to decrease the conveyance velocity, as in step S36, the control unit 40 causes the process to proceed to step S37. On the other hand, when the control unit 40 determines that the instruction from the user is not the instruction to decrease the conveyance velocity, the control unit 40 ends the power load determination process. That is, the control unit 40 controls the second driving unit 26 so that the document D can be conveyed at the first conveyance velocity.

Thus, the control unit 40 determines that the power load value of the second driving unit 26 exceeds the third threshold value TH3 in a state in which the control unit 40 controls the second driving unit 26 so that the second driving unit 26 conveys the document D at the first conveyance velocity, and then, can control the second driving unit 26 so that the second driving unit 26 conveys the document D at the second conveyance velocity.

Effects of Second Embodiment

Effects of the second embodiment will be described.

(2-1) Thus, the control unit 40 determines that the power load value of the second driving unit 26 exceeds the third threshold value TH3 in a state in which the control unit 40 controls the second driving unit 26 so that the second driving unit 26 conveys the document D at the first conveyance velocity, and then, can control the second driving unit 26 so that the second driving unit 26 conveys the document D at the second conveyance velocity. Therefore, the power load value of the second driving unit 26 can be determined using the first threshold value TH1, the second threshold value TH2 greater than the first threshold value TH1, and the third threshold value TH3 smaller than the first threshold value TH1. This makes it possible to diversify control content according to the power load value of the second driving unit 26. Therefore, it is possible to improve the convenience for the user.

Third Embodiment

Next, a third embodiment will be described. In the third embodiment, when the first detection condition is satisfied, the power load value is detected by different control depending on the presence or absence of the document D in the conveyance path 14.

Power Load Detection Process

Figure 8:
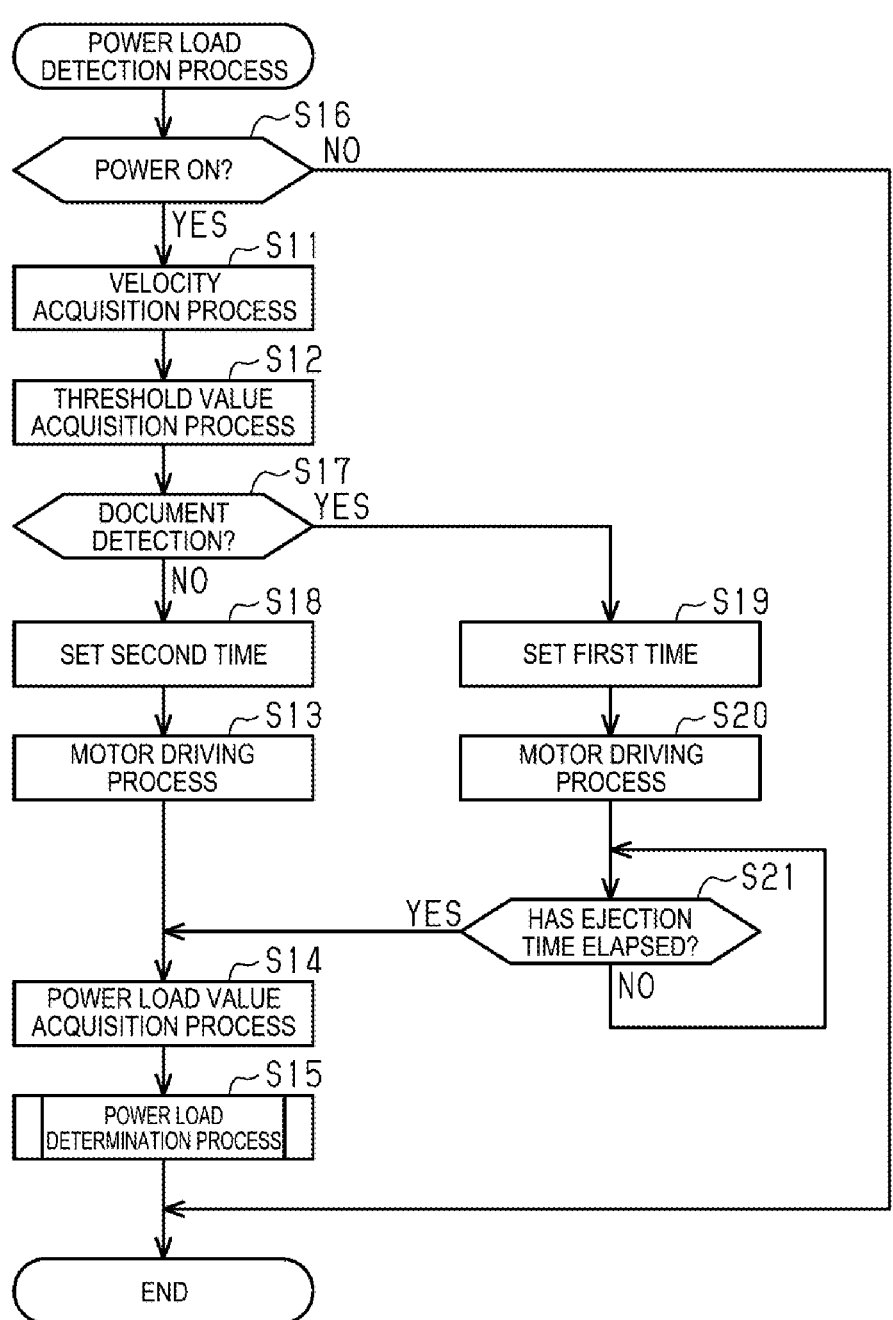
FIG. 8 is a flowchart illustrating a power load detection process.

As illustrated in FIG. 8, in the power load detection process, in step S16, the control unit 40 determines whether or not the power has been turned on. That is, the control unit 40 determines whether or not the first detection condition has been satisfied. When the control unit 40 does not determine that the power has been turned on, the control unit 40 ends the power load detection process. On the other hand, when the control unit 40 determines that the detection condition has been satisfied, the process proceeds to step S11.

When step S12 ends, the control unit 40 causes the process to proceed to step S17. In step S17, the control unit 40 determines whether or not the presence of the document D in the conveyance path 14 has been detected, based on signals from the second document detection unit 29 and the third document detection unit 30. In this process, when at least one of the second document detection unit 29 and the third document detection unit 30 detects the presence of the document D, the control unit 40 determines that the presence of the document D is detected in the conveyance path 14. When the control unit 40 determines that the presence of the document D in the conveyance path 14 is not detected, the process proceeds to step S18. On the other hand, when the control unit 40 determines that the presence of the document D is detected in the conveyance path 14, the process proceeds to step S19.

In step S18, the control unit 40 sets the second time as a time for driving the second driving unit 26. The second time is a time required to detect the power load value of the second driving unit 26. When this process ends, the control unit 40 causes the process to proceed to step S13.

In step S19, the control unit 40 sets a first time as the time for driving the second driving unit 26. The first time is a time longer than the second time. That is, the second time is a time shorter than the first time. The first time is a sum of the second time and an ejection time. The ejection time is a time required to eject the document D in the conveyance path 14 from the ejection port 11B. That is, the first time can be said to be a time in which the document D can be ejected. When this process ends, the control unit 40 causes the process to proceed to step S20.

In step S20, the control unit 40 executes the motor driving process, as in step S13. In step S21, the control unit 40 determines whether or not the ejection time has elapsed. The control unit 40 executes step S21 until the control unit 40 determines that the ejection time has elapsed, and causes the process to proceed to step S14 when the control unit 40 determines that the ejection time has elapsed.

Thus, when the document D is detected in the conveyance path 14 as power-on, the control unit 40 detects the power load value of the second driving unit 26 in a state in which the control unit 40 controls the second driving unit 26 so that the second driving unit 26 conveys the document D at the first conveyance velocity over the first time. On the other hand, when the document D is not detected in the conveyance path 14 when power is turned on, the control unit 40 detects the power load value of the second driving unit 26 in a state in which the control unit 40 controls the second driving unit 26 so that the second driving unit 26 conveys the document D at the first conveyance velocity over the second time shorter than the first time.

Effects of Third Embodiment

Effects of the third embodiment will be described.

(3-1) When the document D is detected when power is turned on, the control unit 40 detects the power load value of the second driving unit 26 in a state in which the control unit 40 controls the second driving unit 26 so that the second driving unit 26 conveys the document D at the first conveyance velocity over the first time in which the document D can be ejected. Therefore, it is possible to detect the power load value of the second driving unit 26 using the first time in which the document D can be ejected when the document D is detected when power is turned on. This makes it possible to share a time for ejecting the document D and a time for detecting the power load value of the second driving unit 26 when power is turned on. Therefore, it is possible to improve the processing efficiency when power is turned on, and to improve the convenience for the user.

(3-2) When the document D is not detected when power is turned on, the control unit 40 detects the power load value of the second driving unit 26 in a state in which the control unit 40 controls the second driving unit 26 so that the second driving unit 26 conveys the document D at the first conveyance velocity over the second time shorter than the first time. Therefore, when the document D is not detected when power is turned on, it is possible to detect the power load value of the second driving unit 26 using the second time shorter than the first time in which the document D can be ejected. Therefore, it is possible to improve the processing efficiency when power is turned on while diversifying the processing when power is turned on, and to improve the convenience for the user.

Fourth Embodiment

Next, a fourth embodiment will be described. In the fourth embodiment, when the control unit 40 determines that the power load value of the second driving unit 26 exceeds the first threshold value TH1, the control unit 40 causes the document D to be conveyed at a conveyance velocity lower than before, and repeatedly determines whether or not the power load value of the second driving unit 26 has exceeded the first threshold value TH1.

Figure 9:
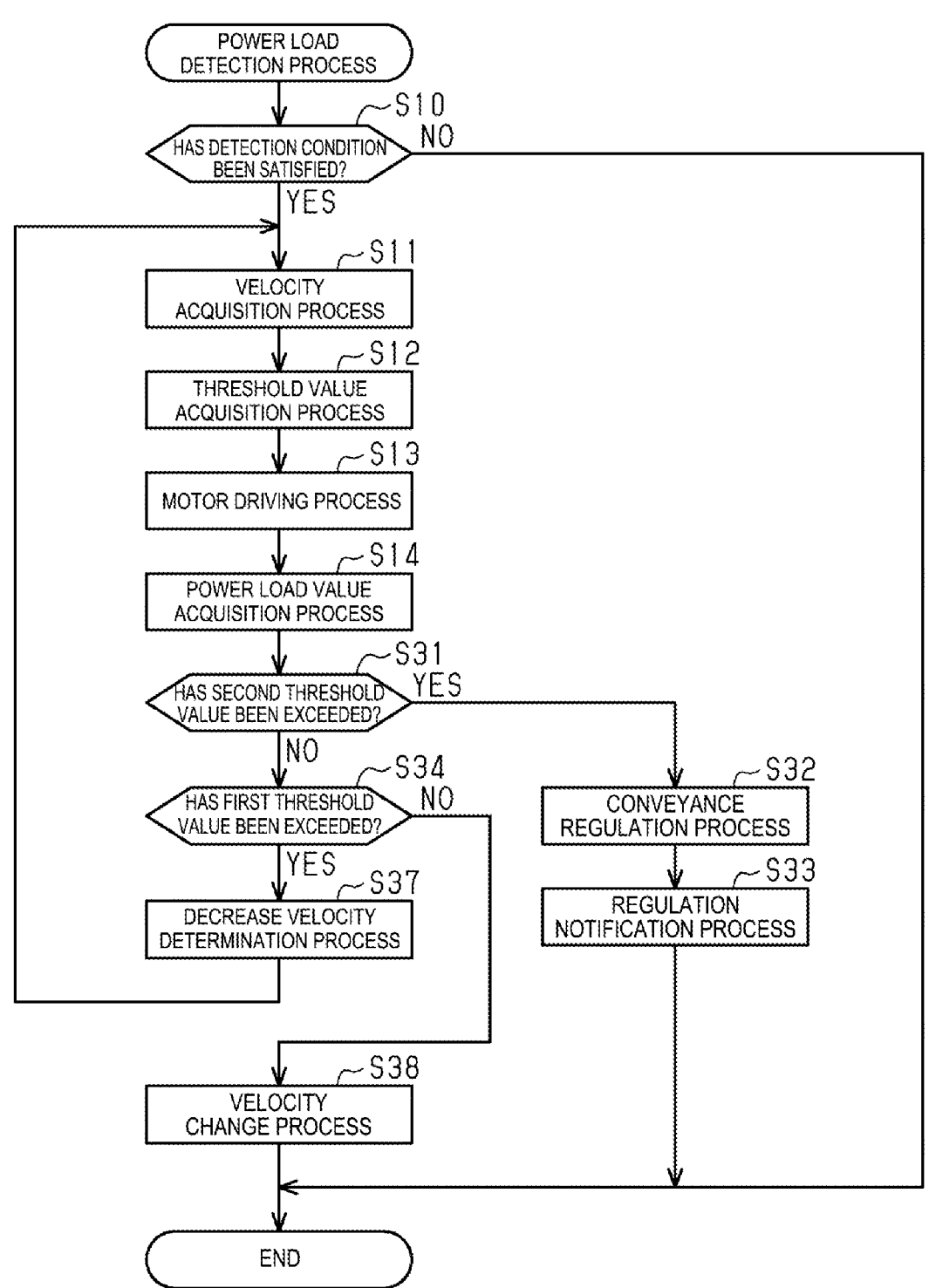
FIG. 9 is a flowchart illustrating a power load detection process.

As illustrated in FIG. 9, in the power load detection process, when step S14 ends, the control unit 40 causes the process to proceed to step S31. When the control unit 40 determines in step S31 that the power load value of the second driving unit 26 has exceeded the second threshold value TH2, the process proceeds to step S32. On the other hand, when the control unit 40 determines that the power load value of the second driving unit 26 does not exceed the second threshold value TH2, the process proceeds to step S34.

When the control unit 40 determines in step S34 that the power load value of the second driving unit 26 has exceeded the first threshold value TH1, the process proceeds to step S37. In step S37, the control unit 40 executes a decrease velocity determination process. In this process, the control unit 40 determines a conveyance velocity reduced from an immediately preceding conveyance velocity by a defined conveyance velocity to be a conveyance velocity of the document D. The defined conveyance velocity is defined to correspond to the immediately preceding conveyance velocity. As the defined conveyance velocity, a constant velocity may be defined for each immediately preceding conveyance velocity, or a different velocity may be defined for each immediately preceding conveyance velocity. The defined conveyance velocity may be a velocity that becomes equal to or lower than the velocity v2 from the first conveyance velocity, or may be a velocity that does not become equal to or lower than the velocity v2 from the first conveyance velocity. When this process ends, the control unit 40 causes the process to step S11 again.

Accordingly, the control unit 40 repeatedly determines whether or not the power load value of the second driving unit 26 exceeds the first threshold value TH1 at a conveyance velocity reduced by the defined conveyance velocity. That is, the control unit 40 determines that the power load value of the second driving unit 26 exceeds the first threshold value TH1, and then, repeatedly performs a determination as to whether or not the power load value of the second driving unit 26 exceeds the first threshold value TH1 in a state in which the control unit 40 controls the second driving unit 26 so that the second driving unit 26 conveys the document D at a conveyance velocity lower than before. In other words, the control unit 40 repeatedly performs the determination as to whether or not the power load value of the second driving unit 26 exceeds the first threshold value TH1 at the conveyance velocity lower than before, until a determination is made that the power load value of the second driving unit 26 does not exceed the first threshold value TH1.

On the other hand, when the control unit 40 determines that the power load value of the second driving unit 26 does not exceed the first threshold value TH1, the process proceeds to step S38. In step S38, the control unit 40 executes a velocity change process. In this process, the control unit 40 stores, in the memory, information indicating a conveyance velocity at which a determination is made that the power load value of the second driving unit 26 does not exceed the first threshold value TH1. That is, the control unit 40 can control the second driving unit 26 so that the second driving unit 26 conveys the document D at the conveyance velocity at which a determination is made that the power load value of the second driving unit 26 does not exceed the first threshold value TH1. In this case, conveyance velocity at which a determination is made that the power load value of the second driving unit 26 does not exceed the first threshold value TH1 corresponds to an example of the second conveyance velocity. When this process ends, the control unit 40 ends the power load determination process.

Effects of Fourth Embodiment

Effects of the fourth embodiment will be described.

(4-1) The control unit 40 determines that the power load value of the second driving unit 26 exceeds the first threshold value TH1, and then, can repeatedly perform a determination as to whether or not the power load value of the second driving unit 26 exceeds the first threshold value TH1 at a conveyance velocity lower than a previous conveyance velocity. Therefore, it is possible to repeatedly perform a determination as to whether or not the power load value of the second driving unit 26 exceeds the first threshold value TH1 at a plurality of conveyance velocities. This makes it possible to curb aging deterioration of the second driving unit 26 by conveying the document D at an appropriate conveyance velocity. Therefore, it is possible to extend the timing itself at which the image reading device 10 becomes nonavailable, and to improve the convenience for the user.

Fifth Embodiment

Next, a fifth embodiment will be described. In the fifth embodiment, the control unit 40 may detect the conveyance velocity of the document D based on the signals from the second document detection unit 29 and the third document detection unit 30. As a specific example, the control unit 40 detects the leading edge of the document D based on the signal from the second document detection unit 29, and then specifies an elapsed time to detect the leading edge of the document D based on a signal from the third document detection unit 30. The control unit 40 may detect the conveyance velocity of the document D based on a distance and an elapsed time of the second document detection unit 29 and the third document detection unit 30. The control unit 40 may acquire the power load value of the second driving unit 26 based on the conveyance velocity of the document D and the current value output to the second driving unit 26.

Thus, the control unit 40 can acquire the power load value of the second driving unit 26 based on an actual conveyance velocity of the document D. Accordingly, the control unit 40 can acquire a power load value including not only the second driving unit 26 but also a power transmission member from the second driving unit 26 to the document D. Therefore, it is possible to extend the timing itself at which the image reading device 10 becomes nonavailable, and to improve the convenience for the user. Further, the power transmission member from the second driving unit 26 to the document D includes at least one of the feed separation roller 22B, the conveyance driving roller 23A, and the ejection driving roller 24A.

Modification Examples

The present embodiment can be changed and implemented as follows. The present embodiment and the following modification examples can be implemented in combination with each other within a technically consistent range.

In the fourth embodiment, in step S21, the control unit 40 may detect the trailing edge of the document D in the conveyance path 14 based on a signal from the third document detection unit 30, and determine whether or not the ejection time has elapsed since the trailing edge of the document D in the conveyance path 14 is detected. The first time may not be determined in advance.

The control unit 40 may correct the power load value of the second driving unit 26 based on whether or not the document D is actually conveyed. As a specific example, when the document D is actually conveyed, the control unit 40 may make the power load value of the second driving unit 26 smaller than when the document D is not actually conveyed.

The image reading device 10 may include a fourth document detection unit that detects a thickness of the document D. The control unit 40 may correct the power load value of the second driving unit 26 based on a detection result of the fourth document detection unit. As a specific example, the control unit 40 may make the power load value of the second drive unit 26 small when the document D is thicker, as compared with a case in which the document D is thin, based on the detection result of the fourth document detection unit. The control unit 40 may specify the thickness of the document D based on an instruction from the user.

A function of the second document detection unit 29 and a function of the third document detection unit 30 may be arbitrary functions. For example, the second document detection unit 29 may be a detection unit having a function of detecting multi-feeding of the document D. The multi-feeding of the document D means that a plurality of documents D are conveyed in a state in which the documents D are overlapped.

A position of the second document detection unit 29 and a position of the third document detection unit 30 may be arbitrary positions. It is preferable for the second document detection unit 29 and the third document detection unit 30 are separated from each other since a detection error of the conveyance velocity of the document D is difficult to occur and the detection accuracy of the conveyance velocity of the document D can be improved.

The control unit 40 may determine whether or not the conveyance velocity is to be decreased, based on the power load value of the second driving unit 26 when a detection condition different from the first detection condition, the second detection condition, and the third detection condition is satisfied as the detection condition. As a specific example, the detection condition may include a condition that is established by the instruction from the user. The detection condition may include a condition that is satisfied when a predetermined period of time, such as one month, has elapsed. The detection condition may include a condition that is satisfied after the number of images read from the document D reaches a defined number. Further, a combination of these detection conditions may also be used. As a specific example, after the number of images read from the document D reaches the defined number, the control unit 40 may determine whether or not the conveyance velocity is to be decreased, based on the power load value of the second driving unit 26 when power is turned on. The control unit 40 may determine whether or not the conveyance velocity is to be decreased, based on the power load value of the second driving unit 26 when the reading instruction is input after a predetermined period of time has elapsed.

The control unit 40 may perform control so that the document D is conveyed at the second conveyance velocity before the reading instruction is input, when the first detection condition is satisfied. That is, control unit 40 may perform control so that the document D is conveyed at the second conveyance velocity before the reading process based on the input of the reading instruction, when the first detection condition is satisfied.

The control unit 40 may output the selection information from at least one of the display unit, the audio output unit, and the light emitting unit. That is, the control unit 40 may output the selection information from the report unit 19. The control unit 40 may cause the terminal display unit 103 of the terminal device 100 to display the selection information.

The control unit 40 may select whether or not the conveyance velocity is to be decreased, based on an instruction from the user, or may automatically decrease the conveyance velocity instead of the instruction from the user.

When the control unit 40 has performed a setting to decrease the conveyance velocity based on the power load value of the second driving unit 26, the control unit 40 may initialize the setting according to an instruction from the user. In other words, when the control unit 40 has performed a setting to decrease the conveyance velocity based on the power load value of the second driving unit 26, the control unit 40 may hold the setting until there is an instruction from the user. When the control unit 40 has performed a setting to decrease the conveyance velocity based on the power load value of the second driving unit 26, the control unit 40 may initialize the setting when a next reading instruction is input according to the instruction from the user. When the control unit 40 has performed a setting to decrease the conveyance velocity based on the power load value of the second driving unit 26, the control unit 40 may initialize the setting after next power-on according to the instruction from the user.

When the control unit 40 has performed a setting to decrease the conveyance velocity based on the power load value of the second driving unit 26, the control unit 40 may initialize the setting when the next reading instruction is input, regardless of the instruction from the user. When the control unit 40 has performed a setting to decrease the conveyance velocity based on the power load value of the second driving unit 26, the control unit 40 may initialize the setting after next power-on, regardless of the instruction from the user.

When the control unit 40 has performed a setting to decrease the conveyance velocity based on the power load value of the second driving unit 26, the control unit 40 may initialize the setting according to the input of the next reading instruction, and then, determine whether to decrease the conveyance velocity again, based on the power load value of the second driving unit 26. In this case, when a frequency at which a determination is made as to whether or not the conveyance velocity is to be reduced, based on the power load value of the second driving unit 26 increases, it is possible to make the determination based on the latest power load value of the second driving unit 26. On the other hand, when a frequency at which a determination is made as to whether or not the conveyance velocity is to be reduced, based on the power load value of the second driving unit 26 decreases, it is possible to curb the control load such as acquisition of the power load value of the second driving unit 26.

The first conveyance velocity may be the conveyance velocity of the document D when the reading resolution is relatively high. The first conveyance velocity may be a reduced conveyance velocity when the conveyance velocity is set to be reduced based on the power load value of the second driving unit 26. That is, the control unit 40 may specify the reduced conveyance velocity as the first conveyance velocity.

The second conveyance velocity may be a conveyance velocity when the reading resolution is relatively high. The second conveyance velocity may be higher than the conveyance velocity when the reading resolution is relatively high. The second conveyance velocity may be lower than the conveyance velocity when the reading resolution is relatively high.

The defined conveyance velocity may be a difference between the conveyance velocity when the reading resolution is relatively low and the conveyance velocity when the reading resolution is relatively high. The defined conveyance velocity may be greater than the difference between the conveyance velocity when the reading resolution is relatively low and the conveyance velocity when the reading resolution is relatively high. The defined conveyance velocity may be smaller than the difference between the conveyance velocity when the reading resolution is relatively low and the conveyance velocity when the reading resolution is relatively high.

The control unit 40 may determine at least one of the first conveyance velocity, the second conveyance velocity, and the defined conveyance velocity according to a designation from the user.

The image reading device 10 may include at least one of the paper feed roller 21, the feed roller pair 22, the conveyance roller pair 23, and the ejection roller pair 24 as rollers, and may include other rollers. The roller that is a target whose conveyance velocity is to be decreased based on the power load value may also be any roller.

The image reading device 10 may include at least one of the first driving unit 25 and the second driving unit 26 as the DC motor, and may include other DC motors. For example, the control unit 40 may control the rotation velocity of the first driving unit 25 based on the power load value of the first driving unit 25, and set DC motors other than the first driving unit 25 and the second driving unit 26 as a target.

The image sensor 33 is not limited to a CMOS image sensor, and may be, for example, a MOS image sensor or may be a CCD image sensor. The image sensor 33 is not limited to a linear image sensor, and may be an area image sensor.

A material of the document is not limited to paper and may be a resin film or sheet, fabric, metal film, or the like.

The image reading device 10 may be a part of a multi-function machine having a printing function and a copying function, in addition to a scanner function. Although the present disclosure is applied to the image reading device 10, the present disclosure is not limited thereto. For example, the present disclosure may be applied to a recording device. The recording device includes a recording unit that performs recording on a medium, a DC motor, rollers, and a control unit. The rollers are configured to convey the medium. The control unit is configured to perform recording on the medium at a timing corresponding to the conveyance velocity.

The phrase "at least any" as used herein means one or more of desired options. As an example, the phrase "at least any" as used herein means only one or both of two options when the number of options is two. As another example, the phrase "at least any" as used herein means only one or any combination of two or more options when the number of options is three or more.

Supplements

Hereinafter, the technical ideas and effects ascertained from the above-described embodiments and modification examples will be described.

(A) An image reading device including: a DC motor; a roller driven by the DC motor; a reading unit configured to read an image from a document conveyed by the roller; and a control unit configured to control driving of the DC motor, wherein the control unit is configured to detect a power load value of the DC motor, and the control unit is configured to determine that the power load value of the DC motor exceeds a first threshold value in a state in which the control unit controls the DC motor to convey the document at a first conveyance velocity, and then, control the DC motor to convey the document at a second conveyance velocity lower than the first conveyance velocity.

With this configuration, even when the power load value of the DC motor exceeds the first threshold value due to aged deterioration of the DC motor, it is possible to curb aging deterioration of the DC motor by conveying the document at the second conveyance velocity lower than the first convey-ance velocity. Therefore, it is possible to extend the timing itself at which the image reading device becomes nonavail-able, and to further improve the convenience for the user.

(B) In the image reading device, the control unit may be configured to control the DC motor to convey the document at the second conveyance velocity when a reading instruc-tion is input, after determining that the power load value of the DC motor exceeds the first threshold value in a state in which the control unit controls the DC motor to convey the document at the first conveyance velocity when power is turned on.

With this configuration, when the power load value of the DC motor exceeds the first threshold value due to aged deterioration of the DC motor when power is turned on, and then, the reading instruction is input, it is possible to curb aging deterioration of the DC motor by conveying the document at the second conveyance velocity. Therefore, it is possible to extend the timing itself at which the image reading device becomes nonavailable, and to improve the convenience for the user.

(C) The image reading device may include a document detection unit configured to detect the document to be conveyed, wherein the control unit may detect the power load value of the DC motor in a state in which the control unit controls the DC motor to convey the document at the first conveyance velocity over a first time in which the document is ejectable, when the document detection unit detects the document when power is turned on.

with this configuration, when the document is detected when power is turned on, it is possible to detect the power load value of the DC motor using the first time in which the document is ejectable. This makes it possible to share a time for ejecting the document and a time for detecting the power load value of the DC motor when power is turned on. Therefore, it is possible to improve the processing efficiency when power is turned on, and to improve the convenience for the user.

(D) The image reading device may include a document detection unit configured to detect the document to be conveyed, wherein the control unit may detect the power load value of the DC motor in a state in which the control unit controls the DC motor to convey the document at the first conveyance velocity over a first time in which the document is ejectable, when the document detection unit detects the document when power is turned on, and the control unit may detect a power load value of the DC motor in a state in which the control unit controls the DC motor to convey the document at the first conveyance velocity over a second time shorter than the first time when the document detection unit fails to detect the document when power is turned on.

With this configuration, it is possible to achieve the same effect as (C). On the other hand, it is possible to detect the power load value of the DC motor using the second time shorter than the first time in which the document is ejectable, when the document is not detected when power is turned on. Therefore, it is possible to improve the processing efficiency when power is turned on while diversifying the processing when power is turned on, and to improve the convenience for the user.

(E) In the image reading device, the control unit, when the reading instruction is input, may detect the power load value of the DC motor in a state in which the control unit controls the DC motor to convey the document at the first convey-ance velocity, before causing the reading unit to read the image from the document.

With this configuration, it is possible to early specify that the power load value of the DC motor exceeds the first threshold value due to aged deterioration of the DC motor. Therefore, it is possible to extend the timing itself at which the image reading device becomes nonavailable, and to improve the convenience for the user.

(F) In the image reading device, the control unit, after a reading instruction is input, may detect the power load value of the DC motor in a state in which the control unit controls the DC motor to convey the document at the first convey-ance velocity, in a period of time after causing the reading unit to read an image from a first document and before causing the reading unit to read an image from a second document subsequent to the first document.

With this configuration, it is possible to early specify that the power load value of the DC motor exceeds the first threshold value due to aged deterioration of the DC motor. Therefore, it is possible to extend the timing itself at which the image reading device becomes nonavailable, and to improve the convenience for the user.

(G) In the image reading device, the control unit may determine that the power load value of the DC motor exceeds a second threshold value greater than the first threshold value in a state in which the control unit controls the DC motor to convey the document at the first conveyance velocity, and then, regulates the conveyance of the document.

With this configuration, the power load value of the DC motor can be determined using both the first threshold value, and the second threshold value greater than the first threshold value. This makes it possible to diversify control content according to the power load value of the DC motor. In particular, when the power load value of the DC motor exceeds the second threshold value, the conveyance of the document is restricted. Therefore, it is possible to curb defects upon the conveyance of the document in advance, and improve the convenience for the user.

(H) The image reading device may include a display unit configured to display information, wherein, when the control unit may cause the display unit to display selection information for causing a user to select whether to convey the document at the second conveyance velocity, when determining that the power load value of the DC motor exceeds the first threshold value in a state in which the control unit controls the DC motor to convey the document at the first conveyance velocity.

With this configuration, it is possible to provide an opportunity to cause the user to select whether to convey the document at the second conveyance velocity lower than the first conveyance velocity when a determination is made that the power load value of the DC motor exceeds the first threshold value. Therefore, it is possible to improve the convenience for the user.

(I) In the image reading device, the control unit may be configured to control the DC motor to convey the document at the second conveyance velocity when conveying the document at the second conveyance velocity is selected, and regulates the conveyance of the document when not conveying the document at the second conveyance velocity is selected.

with this configuration, it is possible to provide the user with an opportunity to select whether to convey the document at the second conveyance velocity. Therefore, it is possible to improve the convenience for the user.

(J) In the image reading device, the control unit may be configured to repeatedly perform a determination as to whether or not the power load value of the DC motor exceeds the first threshold value in a state in which the control unit controls the DC motor to convey the document at a conveyance velocity lower than a previous conveyance velocity, after determining that the power load value of the DC motor exceeds the first threshold value.

With this configuration, it is possible to repeatedly perform a determination as to whether or not the power load value of the DC motor exceeds the first threshold value at a plurality of conveyance velocities. This makes it possible to curb aging deterioration of the DC motor by conveying the document at an appropriate conveyance velocity. Therefore, it is possible to extend the timing itself at which the image reading device becomes nonavailable, and to improve the convenience for the user.

(K) In the image reading device, the control unit may be configured to control the DC motor to convey the document at the second conveyance velocity, after determining that the power load value of the DC motor exceeds a third threshold value smaller than the first threshold value in a state in which the control unit controls the DC motor to convey the document at the first conveyance velocity.

With this configuration, the power load value of the DC motor can be determined using the first threshold value, the second threshold value greater than the first threshold value, and the third threshold value smaller than the first threshold value. This makes it possible to diversify control content according to the power load value of the DC motor. Therefore, it is possible to improve the convenience for the user.

(L) A control method for an image reading device including a DC motor, a roller driven by the DC motor, a reading unit configured to read an image from a document conveyed by the roller, and a control unit configured to control driving of the DC motor, wherein the control unit is configured to determine that a power load value of the DC motor exceeds a first threshold value when the control unit controls the DC motor to convey the document at a first conveyance velocity, and then, control the DC motor to convey the document at a second conveyance velocity lower than the first conveyance velocity. With this configuration, it is possible to achieve the same effects as in (A).

What is claimed is:

1. An image reading device comprising:
   a DC motor;
   a roller driven by the DC motor for subsequent reading by the image reading device of an image of a document conveyed by the roller;
   a control unit configured to control driving of the DC motor, wherein
   the control unit is configured to detect a power load value of the DC motor, and
   the control unit is configured to determine that the power load value of the DC motor exceeds a first power load threshold value in a state in which the control unit controls the DC motor to convey the document at a first conveyance velocity,
   the control unit further configured to respond to the determining that the power load value of the DC motor exceeds a first power load threshold value by controlling the DC motor to convey the document at a second conveyance velocity lower than the first conveyance velocity.

2. The image reading device according to claim 1, wherein
   the control unit is configured to control the DC motor to convey the document at the second conveyance velocity when a reading instruction is input, and in response to the determining that the power load value of the DC motor exceeds the first threshold value in a state in which the control unit controls the DC motor to convey the document at the first conveyance velocity when power is turned on.

3. The image reading device according to claim 2, comprising:
   a document detection unit configured to detect the document to be conveyed, wherein
   the control unit detects the power load value of the DC motor in a state in which the control unit controls the DC motor to convey the document at the first conveyance velocity over a first time in which the document is ejectable, when the document detection unit detects the document when power is turned on.

4. The image reading device according to claim 3, wherein
   the control unit detects a power load value of the DC motor in a state in which the control unit controls the DC motor to convey the document at the first conveyance velocity over a second time shorter than the first time when the document detection unit fails to detect the document when power is turned on.

5. The image reading device according to claim 1, wherein the control unit, when the reading instruction is input, detects the power load value of the DC motor in a state in which the control unit controls the DC motor to convey the document at the first conveyance velocity, before the image reading device reads the image from the document.

6. The image reading device according to claim 1, wherein the control unit, after a reading instruction is input, detects the power load value of the DC motor in a state in which the control unit controls the DC motor to convey the document at the first conveyance velocity, in a period of time after the image reading device reads an image from a first document and before the image reading device reads an image from a second document subsequent to the first document.

7. The image reading device according to claim 1, wherein the control unit determines that the power load value of the DC motor exceeds a second threshold value greater than the first threshold value in a state in which the control unit controls the DC motor to convey the document at the first conveyance velocity, and then, restricts the conveyance of the document.

8. The image reading device according to claim 1, comprising a display unit configured to display information, wherein, when the control unit causes the display unit to display selection information for allowing a user to select whether to convey the document at the second conveyance velocity, when determining that the power load value of the DC motor exceeds the first threshold value in a state in which the control unit controls the DC motor to convey the document at the first conveyance velocity.

9. The image reading device according to claim 8, wherein the control unit is configured to control the DC motor to convey the document at the second conveyance velocity when conveying the document at the second conveyance velocity is selected, and regulates the conveyance of the document when not conveying the document at the second conveyance velocity is selected.

10. The image reading device according to claim 1, wherein the control unit is configured to repeatedly perform a determination as to whether the power load value of the DC motor exceeds the first threshold value in a state in which the control unit controls the DC motor to convey the document at a conveyance velocity lower than a previous conveyance velocity, after determining that the power load value of the DC motor exceeds the first threshold value.

11. The image reading device according to claim 1, wherein the control unit is configured to control the DC motor to convey the document at the second conveyance velocity, after determining that the power load value of the DC motor exceeds a third threshold value smaller than the first threshold value in a state in which the control unit controls the DC motor to convey the document at the first conveyance velocity.

12. A control method for an image reading device including a DC motor, a roller driven by the DC motor for subsequent reading by the image reading device of an image of a document conveyed by the roller, and a control unit configured to control driving of the DC motor, wherein the control unit is configured to determine that a power load value of the DC motor exceeds a first power load threshold value when the control unit controls the DC motor to convey the document at a first conveyance velocity, and the control unit further configured to, in response to that determination that a power load value of the DC motor exceeds a first power load threshold value, control the DC motor to convey the document at a second conveyance velocity lower than the first conveyance velocity.

* * * * *